United States Patent
Khan et al.

(10) Patent No.: US 7,539,672 B2
(45) Date of Patent: May 26, 2009

(54) APPARATUS, SYSTEM, AND METHOD FOR DIRECT RETRIEVAL OF HIERARCHICAL DATA FROM SAP USING DYNAMIC QUERIES

(75) Inventors: Zafrulla Khan, Fremont, CA (US); Peter Bow Kwong Lee, Foster City, CA (US); Sandeep Raghav, Fremont, CA (US); Ranjana Kaur Tasser, Fremont, CA (US); Alan Michael Wintroub, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/420,661

(22) Filed: May 26, 2006

(65) Prior Publication Data

US 2007/0276804 A1 Nov. 29, 2007

(51) Int. Cl.
G06F 7/00 (2006.01)
G06F 17/30 (2006.01)
(52) U.S. Cl. .................. 707/3; 707/4; 707/100
(58) Field of Classification Search .......... 707/3, 707/4, 100, 200; 700/28, 32; 717/102
See application file for complete search history.

(56) References Cited

U.S. PATENT DOCUMENTS

| | | | | |
|---|---|---|---|---|
| 6,523,027 | B1 | 2/2003 | Underwood | 707/3 |
| 6,609,128 | B1 | 8/2003 | Underwood | 707/10 |
| 6,721,747 | B2 * | 4/2004 | Lipkin | 707/10 |
| 6,741,982 | B2 | 5/2004 | Soderstrom et al. | 707/4 |
| 2005/0060048 | A1 * | 3/2005 | Pierre et al. | 700/28 |
| 2007/0027829 | A1 * | 2/2007 | Graf | 707/1 |
| 2007/0192337 | A1 * | 8/2007 | Iyer et al. | 707/100 |

OTHER PUBLICATIONS

Peter A. Boncz et al. "MIL primitives for querying a fragmented world" VLDB Journal (1999) 101-119.
Martin-Hubel "Over the Top Performance" DB2 (2004) vol. 9, No. 1 pp. 37-39.
Donald Kossman "The State of the Art in Distributed Query Processing" ACM Computing Surveys (2002) vol. 32, No. 4 pp. 422-469.
Brahim Medjahed et al. "Business-to-business interactions: issues and enabling technologies" VLDB Journal (2003) 12: 59-85.
Bernard J. Powers "Extracting Data from SAP" Information Systems Control Journal (2000) vol. 4 pp. 34-37.

(Continued)

*Primary Examiner*—Apu M Mofiz
*Assistant Examiner*—Susan Y Chen
(74) *Attorney, Agent, or Firm*—Kunzler & McKenzie

(57) ABSTRACT

An apparatus, system, and method are disclosed for the direct retrieval of hierarchical data from an SAP system. The apparatus includes an input module, a table hierarchy module, a query builder module, a query execution module, and a response builder module. The input module receives a table business object comprising a query criteria. The table hierarchy module determines a table hierarchy associated with the table business object. The query builder module builds a native SAP query based on the table hierarchy and the query criteria. The query execution module executes the native SAP query directly on an SAP database. The response builder module returns results of the native SAP query.

40 Claims, 8 Drawing Sheets

OTHER PUBLICATIONS

"Cons of Allowing ODBC Access to SAP" http://www.sap-basis-abap.com/bc/cons-of-allowing-odbc access-to-sap.htm, May 8, 2005. See wayback_results.pdf also submitted as evidence of publication date.

"Business object structure" IBM documentation, web page http://publib.boulder.ibm.com/infocenter/wbihelp/v6rxmx/topic/com.ibm.wbia_adapters.doc/doc/mysap4/mysap4126.htm#HDRSII-HIERDYNRETBUSOBJDEVSUPPORTEDVERBS, Copyright date 1997, 2004. first accessed and downloaded to a pdf file on or about May 4, 2006, last accessed Dec. 24, 2008.

Internet Archive Wayback Machine, http://web.archive.org/ search URL http://www.sap-basis-abap.com/bc/cons-of-allowing-odbc-access-to-sap,htm; Searched on or about Dec. 24, 2008. wayback_results.pdf.

* cited by examiner

US 7,539,672 B2

APPARATUS, SYSTEM, AND METHOD FOR DIRECT RETRIEVAL OF HIERARCHICAL DATA FROM SAP USING DYNAMIC QUERIES

BACKGROUND OF THE INVENTION

1. Field of the Invention

This invention relates to direct data retrieval from an SAP system and more particularly relates to direct hierarchical querying of an SAP system.

2. Description of the Related Art

Systeme, Anwendungen, Produkte in der Datenverarbeitung, or Systems, Applications, and Products in Data Processing (SAP), is an enterprise information and management package that is used worldwide. The SAP system tracks and manages data relevant to an enterprise, including sales, production, finance, accounting, and human resources.

SAP software is highly customizable to fit a customer's needs, and contains many tools for the integration and linking of third party systems and software. It also runs on multiple hardware platforms. SAP data typically resides in a central database that is shared by SAP components. A variety of databases may be used for the central database, including Oracle, Informix, Online, Adabas, DB2, DB/400, and Microsoft SQL Server 6.

Business application programming interfaces (BAPIs) are one way that an SAP system may be accessed. BAPIs provide access to an SAP database from either within SAP or from other development platforms and third party applications external to SAP that support the remote function call (RFC) protocol. One objective of BAPIs is to provide a higher level of integration between SAP and external applications and systems.

BAPI'S, SAP applications, and parts of SAP's basic system are developed using SAP's advanced business application programming (ABAP) language. ABAP is SAP's fourth generation language. ABAP is used for customization and modification of SAP applications.

When using SAPs BAPIs, the user is limited to access the SAP database according to the functions defined and made available in the BAPIs. Some standard database functions are not implemented in the BAPIs, limiting the functionality and versatility of the SAP system when being accessed using the BAPIs. For example, it is not possible to check for the existence of data satisfying a certain criteria without retrieving the data. In addition, retrieve-all functionality is not available. Many users, like those integrating an SAP system with another enterprise information system, require quick, dynamic access to the data contained in the SAP database. These users are limited to BAPI supported functions, and the unnecessary overhead that many of the BAPI supported functions include.

The ABAP application API offers access to the SAP database, but does not give access to relevant SAP data, such as table hierarchies including foreign key relationships. The ABAP application API also does not provide access to certain SAP tables. This also severely limits the ability of a user to dynamically query or access data using the ABAP application API.

From the foregoing discussion, it should be apparent that a need exists for an apparatus, system, and method for direct dynamic retrieval of hierarchical data from SAP. Beneficially, such an apparatus, system, and method would also offer quick, dynamic access to an SAP database using more query types than are available using the BAPI'S, while retaining all relevant SAP information, including table hierarchies.

SUMMARY OF THE INVENTION

The present invention has been developed in response to the present state of the art, and in particular, in response to the problems and needs in the art that have not yet been fully solved by currently available SAP system access methods. Accordingly, the present invention has been developed to provide an apparatus, system, and method for direct retrieval of hierarchical data from SAP using dynamic queries that overcome many or all of the above-discussed shortcomings in the art.

The apparatus to retrieve hierarchical data from SAP is provided with a plurality of modules configured to functionally execute the necessary steps of receiving a table business object (BO), determining a table hierarchy, building a native SAP query, executing the native SAP query, and returning results of the native SAP query. These modules in the described embodiments include an input module, a table hierarchy module, a query builder module, a response builder module, a default override module, an exists module, a retrieve-all module, a read-only module, a data collector module, a table discovery module, a table business object module, a table linker module, a selection module, and a default definition module.

The input module, in one embodiment, receives a table business object comprising a query criteria including at least one non-key field. In another embodiment, the table business object contains an embedded query business object having a default query criteria including at least one non-key field, and one or more default query parameters. In a further embodiment, one or more of the table business objects contains a child table business object.

In one embodiment, the table hierarchy module determines a table hierarchy associated with the table business object. In another embodiment, the table hierarchy is based on table foreign key relationships.

In a further embodiment, the query builder module builds a native SAP query based on the table hierarchy and the query criteria. In another embodiment, the query builder builds a native SAP query that is compatible with a proprietary SAP database interface.

The query execution module, in one embodiment, executes the native SAP query directly on an SAP database. In one embodiment, the response builder module returns results of the native SAP query.

In a further embodiment, the default override module dynamically overrides the query criteria. In one embodiment the default override module overrides the query criteria with a user supplied query criteria.

The exists module, in one embodiment, discovers that data satisfying the query criteria exists in the SAP database. In another embodiment, the retrieve-all module retrieves each data record of the query criteria from the SAP database. In a further embodiment, the read-only module limits query execution to read-only queries.

The data collector module, in one embodiment, automatically executes the native SAP query as an equivalent plurality of direct queries on the SAP database. In a further embodiment, each direct query is configured to satisfy SAP size constraints.

In one embodiment, the table discovery module discovers accessible SAP database tables. In another embodiment, the table discovery module discovers accessible table hierarchies.

In a further embodiment, the table business object module builds table business objects representing SAP database tables. In one embodiment, the table business object module is coupled to the table linker module, which links table business objects according to SAP database table hierarchies. In another embodiment, the table business object module is coupled to the selection module, which selects at least one SAP database table and one or more columns for representation in a table business object. In one embodiment, the table business object module is coupled to the default definition module, which defines a default query criteria for inclusion in a table business object.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
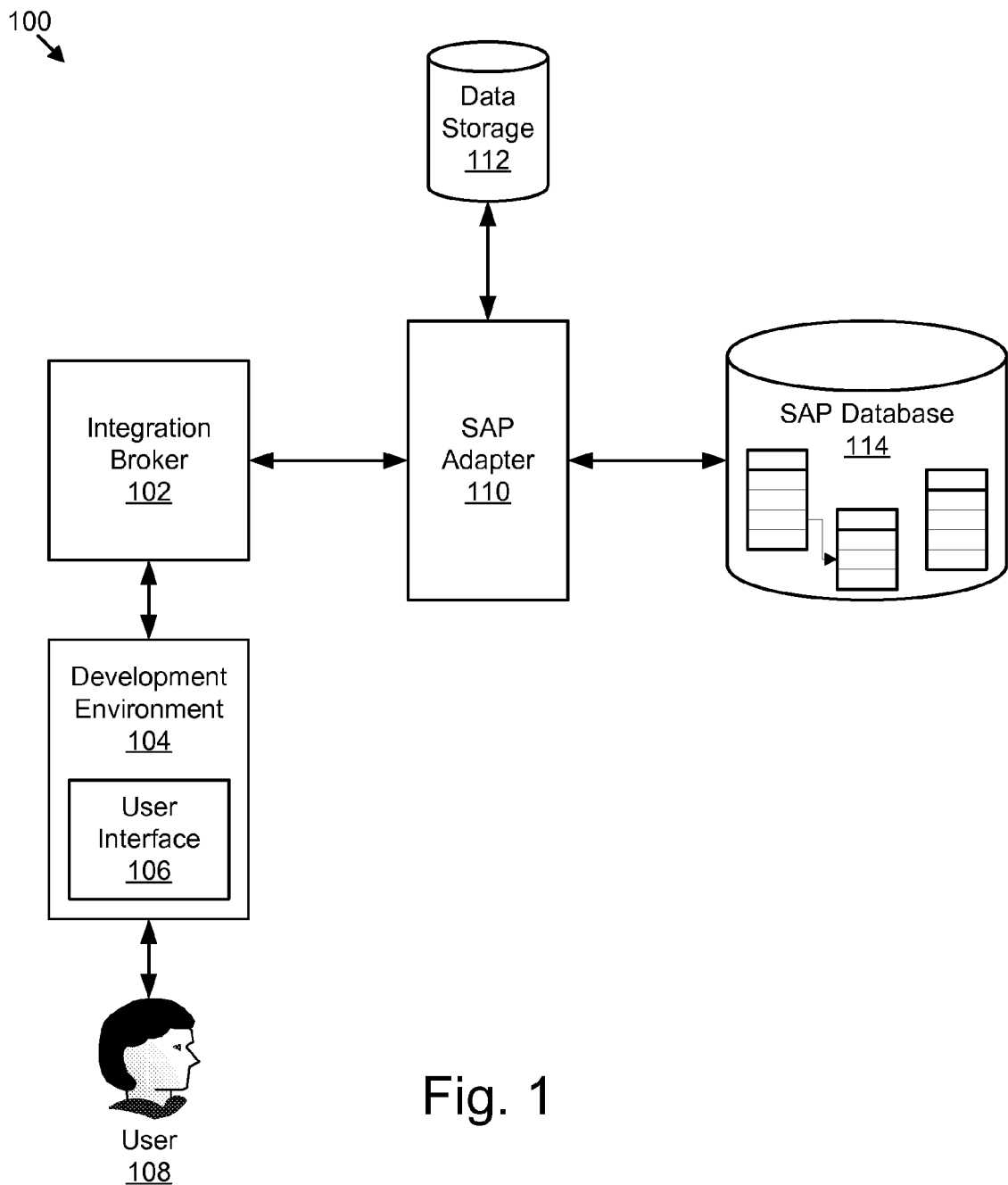
FIG. 1 is a schematic block diagram illustrating one embodiment of an SAP database access system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an SAP database access system 100. The illustrated SAP database access system 100 includes an integration broker 102, a development environment 104, and an SAP adapter 110.

In one embodiment the integration broker 102 is coupled to both the development environment 104 and the SAP adapter 110, facilitating communication between the development environment 104 and the SAP adapter 110. Other environments, clients, or enterprise information systems may also be coupled to the integration broker 102.

The development environment 104 defines table business objects. In one embodiment, the SAP adapter 110 defines the table business objects for the development environment 104 using input from the development environment 104. Business objects are objects which represent an item, event, or entity. A business object includes the attributes, parameters, and information associated with the item, event, or entity that the business object represents. Business object definitions may be stored in persistent storage. Business objects may be stored in many formats, including extensible markup language (XML), or as an XML schema definition (XSD). A table business object represents an SAP database table, and comprises table attributes and parameters that assist in accessing the SAP database table.

In one embodiment, the table business objects defined by the development environment 104 are linked to form a table business object hierarchy representing a table hierarchy in an SAP database. The table business object hierarchy may be based on table foreign key relationships. A table hierarchy is a group of tables that have one or more elements in common. An element in a child table that is also in a parent table is referred to as a foreign key. For example, an employee's identification number may be found in an employee information table, and also in a number of other tables tracking transactions, salaries, schedules, equipment, and the like. In this example, in order to link the employee's identification number in one of the child tables to the employee's name or any other data in the parent table, knowledge of the table hierarchy, meaning the foreign key relationships, is necessary. Each table should have one or more key fields. Key fields, or primary keys, are the one or more fields that uniquely identify a record in the table.

In another embodiment, each table business object comprises a query business object. Just as a table business object represents an SAP database table, and comprises information associated with the SAP database table, a query business object represents an SAP database query, and includes the information necessary to execute the SAP database query.

In one embodiment, the development environment 104 comprises a user interface 106. The development environment 104 may define the table business objects according to data received from the user interface 106, provided by a user 108. In a further embodiment, the user 108 selects the tables and columns that are included in the table business objects, and in the table business object hierarchy.

One example of the SAP adapter 110 is provided and described in more detail with reference to FIG. 2. In general, the SAP adapter 110 provides an interface for other systems, clients, and modules to access an SAP database 114. In one embodiment, the SAP adapter 110 performs the steps of retrieving hierarchical data directly from the SAP database 114 using dynamic ad hoc queries. In a further embodiment, the SAP adapter 110 receives a table business object from the integration broker 102, and returns results of the query in a table business object to the integration broker 102.

In one embodiment, the SAP adapter 110 is coupled to a data storage device 112 and to the SAP database 114. The SAP adapter 110 may use the data storage device 112 to store or manipulate data, such as table business object definitions, query business objects, or query response containers. The SAP database 114 is any SAP product capable of storing or accessing database records.

Figure 2:
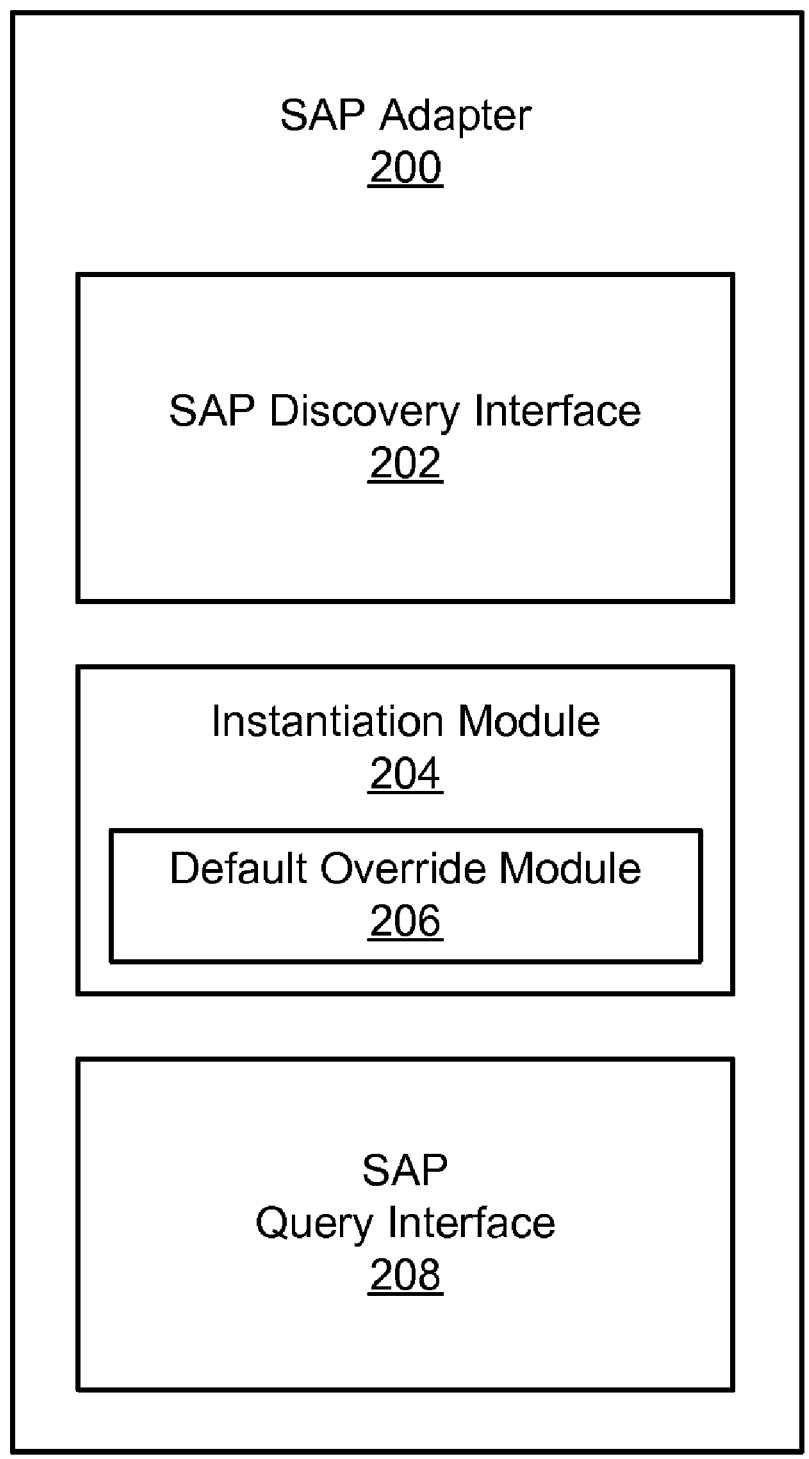
FIG. 2 is a schematic block diagram illustrating one embodiment of an SAP adapter in accordance with the present invention.

FIG 2. depicts one embodiment of an SAP adapter 200 that may be substantially similar to the SAP adapter 110 of FIG 1. As described above, the SAP adapter 200 provides an interface for other systems, clients, and modules to access an SAP database, retrieving hierarchical data directly from an SAP system to system to satisfy dynamic queries. The SAP adapter 200 comprises an SAP discovery interface 202, an instantiation module 204, and an SAP query interface 208. The SAP adapter 200 may be installed on a computer system such as a server or a personal computer. The computer system, in one embodiment, executes at least portions of the SAP adapter 200 such as the SAP discovery interface 202, the instantiation module 204, and the SAP query interface 208.

One example of the SAP discovery interface 202 is provided and described in more detail with reference to FIG. 3. In general the SAP discovery interface 202 discovers accessible SAP tables, and defines table business objects to represent the tables. In one embodiment, the SAP discovery interface 202 discovers accessible SAP tables, and defines table business objects for the development environment 104 of FIG. 1 as described above. Accessible SAP tables may be those for which a user has access rights.

In one embodiment, the instantiation module 204 instantiates one or more business objects defined by the SAP discovery interface 202. In a further embodiment, the SAP discovery interface defines a table business object as an XSD, and the instantiation module 204 instantiates the table business object in an XML structure.

In one embodiment, the SAP query interface 208 provides an interface for dynamic query access to an SAP database. The SAP query interface 208 is provided and described in more detail with reference to FIG. 4. In general, the SAP query interface 208 receives a table business object comprising a query criteria, executes a native SAP query directly on an SAP database, and returns results of the native SAP query in a table business object or container.

A query criteria is a string that requests data that conforms to certain conditions. In one embodiment, the query criteria is any "where" clause supported by SAP. In another embodiment, the query criteria is a structured query language (SQL) "where" clause. In a further embodiment, the query criteria is part of a query business object embedded in a table business object, as defined above. The "where" clause may refer to any property value or parameter in the table business object or any of the children table business objects using an Xpath expression. An XPath expression may be used to traverse the hierarchy of a business object and access a child node or attribute of the business object. In one embodiment, each XPath expression in the "where" clause is identified by a '/,' to signal that the value is the value found by following the XPath expression, and that the XPath expression should be replaced by the value of the parameter referenced. One example of a "where" clause is given in further detail with regards to FIG. 5.

A native SAP query includes query criteria that are compatible with SAP, and that is configured to reflect a table hierarchy in an SAP database when the table hierarchy is relevant to the query criteria. For example, in the employee database described above, if a user requires a list of the names of employees earning salaries within a certain range, an employee's name and salary may be stored in separate tables. Therefore, a condition must be added, requiring that the employee identification number in the salary table is equal to the employee identification number in the parent employee information table. This is also called a join operation.

Because the query criteria may refer to any property value or parameter in the table business object, the query criteria may include both key fields and non-key fields. This means that a query criteria may select data based not only on the defining or key fields, but on any field in the table. For example, the employee identification number from the employee database described above is a key field that is unique to each record or employee. Advantageously queries include constraints on non-key fields as well as key fields. For instance, to retrieve the name and employee number of employees earning more than X dollars, the query criteria requests rows whose salary field is greater than X dollars. This query, and many others, cannot be defined using just key fields such as the employee number. Because of this restriction, accepting query criteria that includes both non-key fields and optionally, key fields increases the functionality of the query criteria, allowing for more robust and flexible queries.

Some query types, like a query criteria for a range of values, are not available in the BAPIs. In one embodiment, the SAP query interface 208 uses the ABAP application API, which does support range and other queries, but does not retain table hierarchy information. For that purpose, the SAP query interface 208 builds a native SAP query that reflects relevant table hierarchy information.

In one embodiment, the instantiation module 204 comprises a default override module 206. The instantiation module 204 overrides or replaces one or more table business object default values provided by the SAP discovery interface 202 using the default override module 206. In another embodiment, the default override module 206 may use values specific to a query type, or user supplied values to replace the table business object default values. By allowing the user to override a default value, the user may perform a dynamic ad hoc query, or use a default query that they defined previously.

Figure 3:
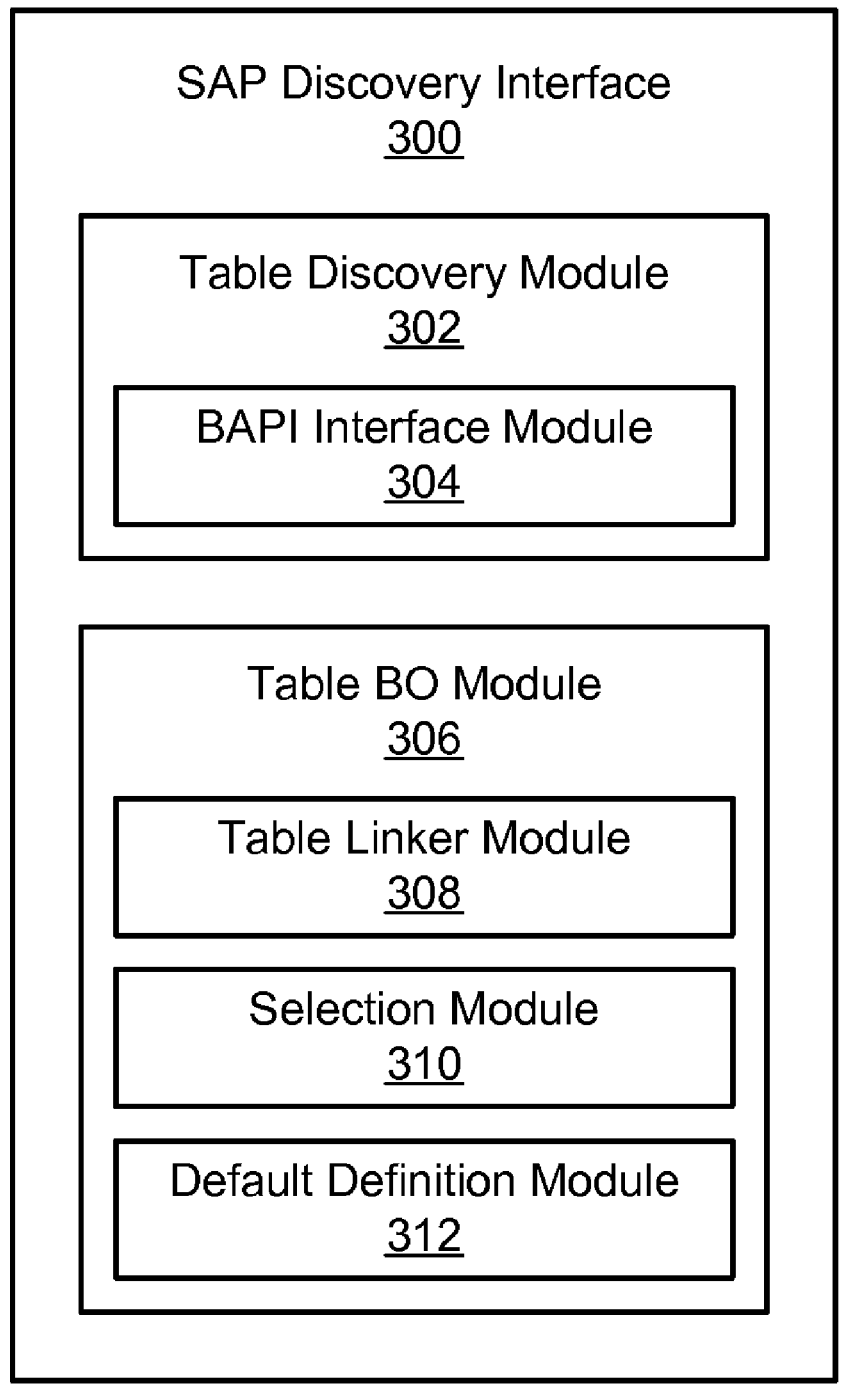
FIG. 3 is a schematic block diagram illustrating one embodiment of an SAP discovery interface in accordance with the present invention.

FIG. 3 depicts one embodiment of an SAP discovery interface 300 that may be substantially similar to the SAP discovery interface 202 of FIG. 2. As described above, the SAP discovery interface 300 discovers accessible SAP tables, and builds table business objects to represent the tables. The illustrated SAP discovery interface 300 includes a table discovery module 302, and a table business object module 306.

In one embodiment, the table discovery module 302 discovers all accessible SAP database tables. In a further embodiment the table discovery module 302 comprises a BAPI interface module 304. The table discovery module 302 communicates with the SAP system using the BAPI interface module 304. BAPI interface module 304 accesses the SAP system using SAP provided BAPI's, and abides by SAP security policies. In another embodiment, the table discovery module 302 also discovers accessible SAP database table hierarchies. In one embodiment an SAP database table hierarchy comprises one or more SAP database tables with an established foreign key relationship.

In one embodiment, the table business object module 306 builds table business objects representing SAP database tables. The table business object module 306 may build the table business objects for the development environment 104 of FIG. 1 as described above. In a further embodiment, each table business object built by the table business object module 306 comprises a query business object. The illustrated table business object module 306 also includes a table linker module 308, a selection module 310, and a default definition module 312.

In one embodiment, the table linker module 308 links the table business objects according to SAP database table hierarchies. Including table hierarchy information in a table business object makes it possible to build a native SAP query using the information included in the table business object. This is especially useful when using interfaces like the ABAP application API that do not preserve table hierarchies. The table linker module 308 may link table business objects by embedding a child table business object in a parent table business object, by using pointers, or by using another linking method.

In one embodiment, the selection module 310 selects at least one SAP database table and one or more columns for representation in a table business object. The selection module 310 may perform the selection based on input from a user, a client, a service, or another module. The user interface 106 of FIG. 1 may also present a graphical user interface (GUI) to the user 108 of FIG. 1 to facilitate the entry of selections. One example of the GUI is provided and described in more detail with reference to FIG. 5. In cases where many tables are accessible to the user, or a table comprises many columns, a selection of only tables and columns of interest to a user greatly simplifies the user's interactions with the tables.

In one embodiment, the default definition module 312 defines default query criteria for inclusion in a table business object. The default query defines the data that will be retrieved from the table by default. In many cases, a user requires the same data from a table with every access. By using a default query, the data will be retrieved without requiring the user to enter the same query criteria for each access. The default query criteria may be included directly in a table business object, or in a query business object embedded in a table business object. In one embodiment the default query criteria is provided to the default definition module 312 by a user, a client, a service, or another module. The user interface 106 of FIG. 1 may also present a GUI to the user 108 of FIG. 1 to facilitate the entry of definitions. The query criteria may be an SQL "where" clause, or any other query criteria supported by an SAP database.

Figure 4:
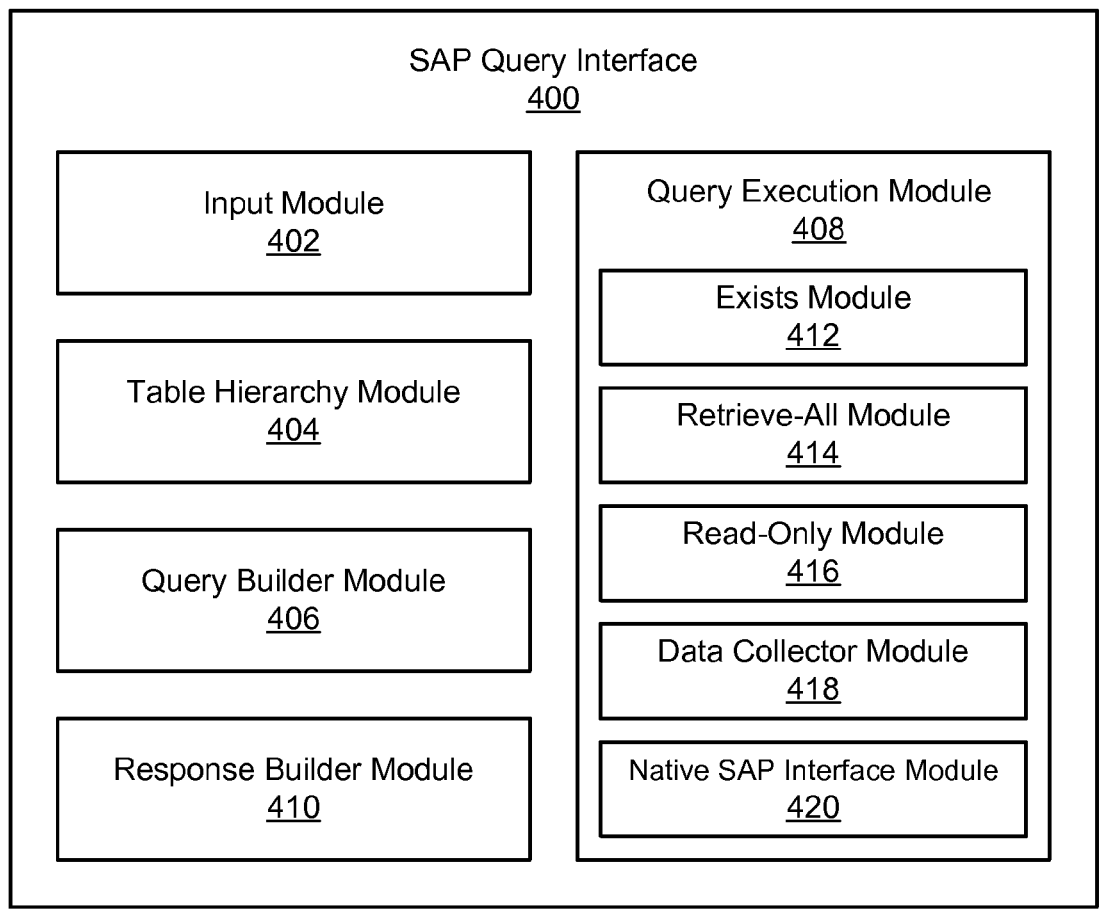
FIG. 4 is a schematic block diagram illustrating one embodiment of an SAP query interface in accordance with the present invention.

FIG. 4 depicts one embodiment of an SAP query interface 400 that may be substantially similar to the SAP query interface 208 of FIG. 2. As described above, the SAP query interface 400 receives a table business object comprising a query criteria, executes a native SAP query directly on an SAP database, and returns results of the native SAP query. The illustrated SAP query interface 400 includes an input module 402, a table hierarchy module 404, a query builder module 406, a query execution module 408, and a response builder module 410.

In one embodiment, the input module 402 receives a table business object comprising a query criteria. The query criteria may be included directly in the table business object, or in a query business object embedded in the table business object. The query business object may also include other query parameters. In one embodiment, the query business object comprises a query criteria in a format supported by SAP, and one or more additional query parameters. In a further embodiment, the one or more additional query parameters represent the maximum number of rows to be returned, the number of rows to skip before retrieving data, and the like.

In one embodiment, the table hierarchy module 404 determines a table hierarchy associated with a table business object. The table hierarchy module 404 determines the table hierarchy by using information stored in the table business object. The useful information may include embedded table business objects, links to parent or children table business objects, or other table hierarchy data. In a further embodiment, the table hierarchy module 404 determines the table hierarchy by discovering whether the table business object has a parent table business object.

In one embodiment, the query builder module 406 builds a native SAP query based on a table hierarchy and a query criteria. In a further embodiment, the table hierarchy used by the query builder module 406 is the table hierarchy discovered by the table hierarchy module 404. The query criteria may be any valid SAP query criteria, supported by any SAP interface. In another embodiment, the query builder module 406 builds a native SAP query that is compatible with a proprietary SAP database interface. In one embodiment, multiple query types may be built by the query builder module 406. In this manner, the present invention supports queries on SAP tables that are not accessible using non-proprietary SAP interfaces. The query builder module 406 may discover the query type from a condition of the query criteria, or from information in a table business object or a query business object.

Two possible query types supported by the present invention are an "exists" query and a "retrieve-all" query. In one embodiment, the query builder module 406 builds the native SAP query differently depending on the type of query being built. In cases where the query is of an "exists" query type, the query builder module 506 uses the query criteria in its original form regardless of the table hierarchy. In cases where the query is of a "retrieve-all" query type, the query builder module 406 may adjust the query criteria to reflect the table hierarchy.

In one embodiment, the query execution module 408 executes a native SAP query directly on an SAP database. In a further embodiment, the native SAP query is executed directly on an SAP database using the ABAP application API. The illustrated query execution module 408 comprises an exists module 412, a retrieve-all module 414, a read-only module 416, a data collector module 418, and a native SAP interface module 420.

In one embodiment, the exists module 412 discovers that data satisfying a query criteria exists in an SAP database. In a further embodiment, the exists module 412 configures one or more query parameters to execute an "exists" query. This means that the exists module 412 may configure query parameters so that the "exists" query checks for the existence of data, without returning the data, or only returning one row of data. In one embodiment, the exists module 412 returns a table business object containing the results of the "exists" query. In another embodiment, the exists module 412 throws an exception or signals a failure if data satisfying the query criteria does not exist in the SAP database, and returns a table business object comprising the original query criteria if data satisfying the query criteria does exist in the SAP database.

In one embodiment, the retrieve-all module 414 retrieves each data record satisfying a query criteria from an SAP database. In a further embodiment, the retrieve-all module 414 retrieves and uses one or more query parameters from an embedded query business object to execute a "retrieve-all" query. One example of a table business object data structure with an embedded query business object is described in more detail with reference to FIG. 8.

In one embodiment, the read-only module 416 limits query execution to read-only queries. In a further embodiment, the read-only module 416 limits query execution to read-only queries by connecting the query execution module 408 to a read-only SAP interface for query execution. In another embodiment, the read-only module 416 performs a check on each native SAP query built by the query builder module 406, and allows the query builder module 406 to send only read-only or noninvasive queries to the query execution module 408.

In one embodiment, the data collector module 418 executes a native SAP query as an equivalent plurality of direct queries on an SAP database. In a further embodiment, each direct query is configured to satisfy SAP size constraints. For example, the SAP ABAP application API limits data retrieval to query calls of up to 512 bytes. If the total size of the data for the fields, or columns, being queried in each row exceeds 512 bytes, then the field list, or column list, for the query is split into multiple sub lists. The size of the data returned by a direct query using the sub list is then less than or equal to 512 bytes. The data collector module 418 executes each of a plurality of direct queries until all appropriate data has been retrieved.

In one embodiment, the native SAP interface module 420 communicates with an SAP database using a native interface. In a further embodiment, the native interface is the ABAP application API. The native SAP interface module 420 sends a native SAP query directly to an SAP database and receives response data from the SAP database.

In one embodiment, the response builder module 410 returns results of a native SAP query. In a further embodiment, the response builder module 410 populates one or more table business objects with the results of the native SAP query and returns the table business objects. In another embodiment, the response builder module 410 places the table business objects in a container business object and returns the container business object.

Figure 5:
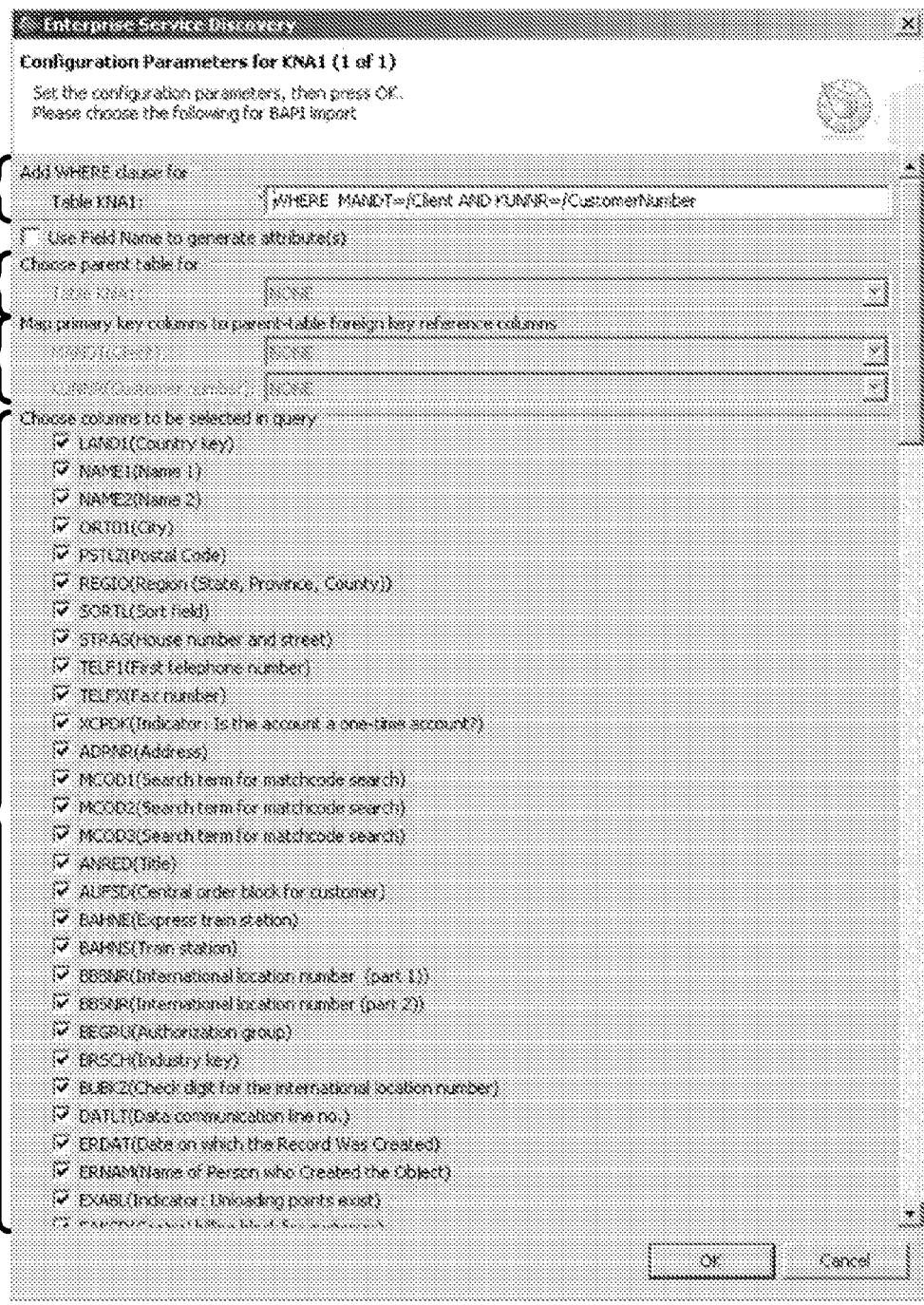
FIG. 5 is a screenshot illustrating one embodiment of a business object designer GUI in accordance with the present invention.

FIG. 5 is a screenshot illustrating one embodiment of a business object designer GUI 500, that may be similar to the GUI that the user interface 106 presents to the user 108 of FIG. 1. The business object designer GUI 500 has a "where" clause field 502, a parent table field 504, a primary-key-to-foreign-key mapping field 506 for each table primary key, and a column selection field 508.

In one embodiment, the user enters an SAP supported query criteria into the "where" clause field 502, as described above. The example "where" clause in the "where" clause field 502 is "WHERE MANDT=/Client AND KUNNR=/CustomerNumber." In this example, "MANDT" and "KUNNR" are the primary keys for the table. "/Client" and "/CustomerNumber" are Xpath expressions in the table business object that represent the values that should match values in the "MANDT" and "KUNNR" columns, respectively.

In one embodiment, the user enters the name of a parent table into the parent table field 504. The table hierarchy module 404 of FIG. 4 described above may use the information from the parent table field 504 to determine the table hierarchy of the table business objects.

In one embodiment, the user enters the names of each parent table foreign key reference column into the primary-key-to-foreign-key mapping field 506. As described above, an element in a child table that is also in a parent table is referred to as a foreign key. The primary-key-to-foreign-key mapping field 506 provides an area to map each primary key in the table to a parent table foreign key reference column, if applicable.

In one embodiment, the user selects one or more columns from the column selection field 508. Only columns selected by the user will be selected by the query. As described above, in situations where a table contains many columns, the user may simplify query results by selecting only the subset of columns that is relevant to the query from the column selection field 508.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
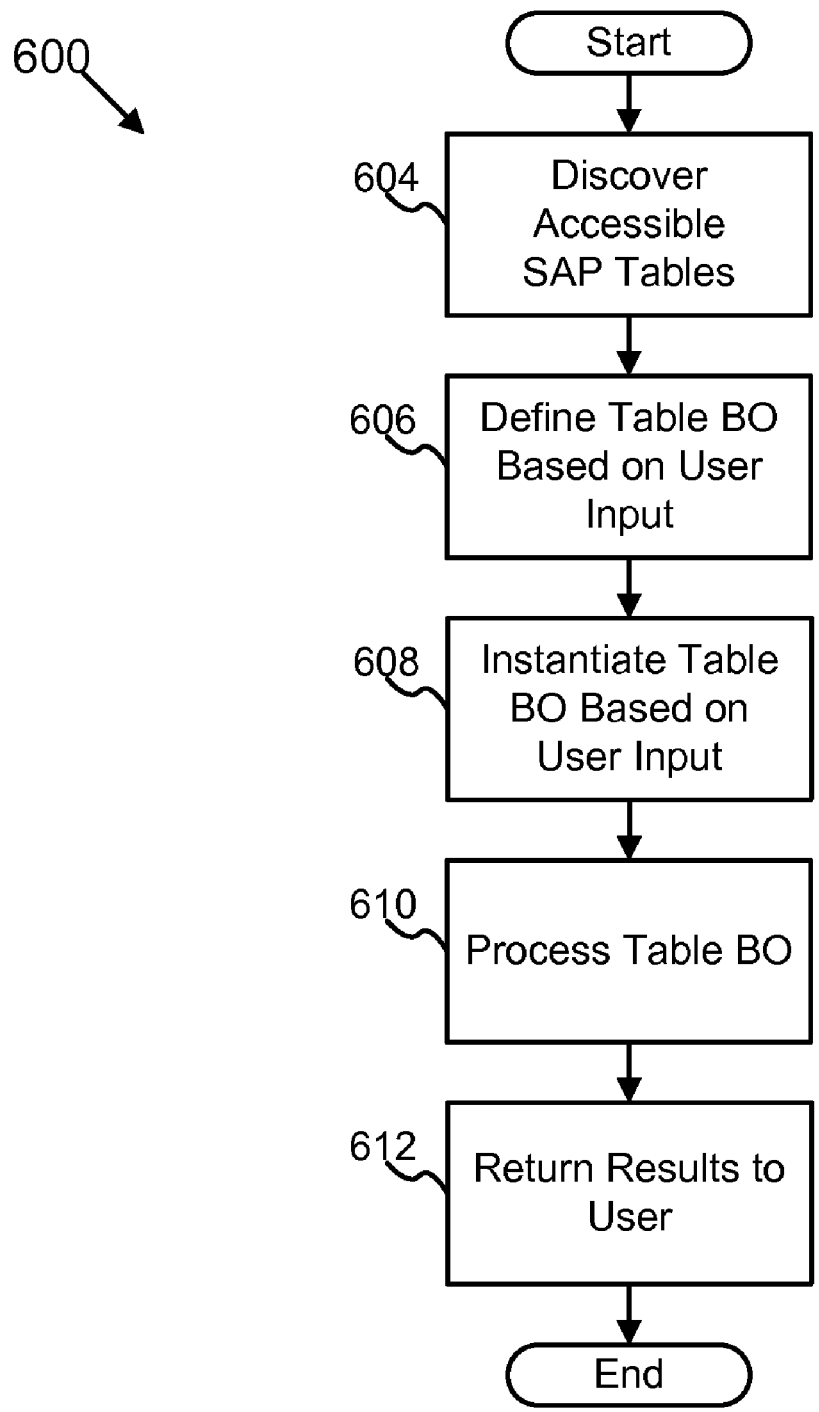
FIG. 6 is a schematic flow chart diagram illustrating one embodiment of a dynamic SAP hierarchical data retrieval method in accordance with the present invention.

FIG. 6 illustrates one embodiment of a dynamic SAP hierarchical data retrieval method 600 that may be implemented by the dynamic SAP hierarchical data retrieval system 100 of FIG. 1. Reference to the SAP adapter 200 is understood to alternatively refer to any other SAP adapter or corresponding SAP adapter operation described herein. Reference to the SAP discovery interface 300 is understood to alternatively refer to any other SAP discovery interface or SAP discovery operation described herein. Reference to SAP query interface 400 is understood to alternatively refer to any other SAP query interface or SAP query operation described herein.

In the illustrated data retrieval method 600, the table discovery module 302 discovers 604 accessible SAP database tables and table hierarchies. In one embodiment, the discovery 604 is initiated by user 108, and relayed to the SAP adapter 110 by the integration broker 102. The discovery module 302 may use any SAP interface. In one embodiment, the discovery module 302 discovers 604 accessible SAP database tables and table hierarchies using the BAPI interface module 304. In another embodiment, the discovery module 302 abides by SAP security and permissions when discovering 604 accessible SAP database tables and table hierarchies. In a further embodiment, the table hierarchies discovered 604 by the discovery module 302 are SAP database tables with an established foreign key relationship, as described above. Each parent table in the table hierarchy comprises a column for each child table which is represented as a foreign key column in the child table.

The table business object module 304 then defines 606 one or more table business objects based on data discovered 604 by the table discovery module 302 and on user input. The table business object definitions may be stored as described above. In one embodiment the table linker module 308 links tables according to the table hierarchy discovered 604 by the table discovery module 302.

In a further embodiment, the table linker module 308 defines links between table business objects by embedding child table business objects. In another embodiment, the selection module 310 selects tables, columns, and other attributes for inclusion in the table business object definition. This selection may be based on input from a user, process, module, client, or any other object.

In one embodiment, the default definition module 312 defines 606 default definitions for one or more table business object parameters. In one embodiment, the default definitions include a default query criteria. In another embodiment, the default definitions include a maximum number of rows to retrieve, and a number of rows to skip before returning data. In a further embodiment, the default query criteria, and one or more default parameter definitions are stored in a query business object embedded in each table business object. In one embodiment, selections and default definitions are made by the user 108, and relayed to the SAP adapter 110 by the integration broker 102. One example of a table business object hierarchy with embedded query business objects is provided and described in more detail with reference to FIG. 8.

In another embodiment, the table business objects defined 606 by the table business object module 306 may also consist of application specific information (ASI). The ASI may include table or column names, a data delimiter, a field type, a variable denoting whether or not the property is a key, a reference to the parent table key parameter if the property is a foreign key, and any other parameters.

The instantiation module 204 instantiates 608 one or more table business objects based on the definitions defined 606 by the table business object module 306. The instantiation module 204 may instantiate 608 the one or more table business objects substantially after the table business object module 306 defines 606 the one or more table business objects. As described above, each table business object may contain a query business object, and one or more embedded children table business objects. The instantiation module 204 may instantiate 608 all parameters and values included in a table business object using default values defined 606 by the table business object module 306, or using values provided by the default override module 206. The default override module 206 may provide override values obtained from a user, client, process, module, or any other object. By overriding the query criteria, the query becomes dynamic, or defined dynamically and then executed. In one embodiment, default overrides are made by the user 108, and relayed to the default override module 206 by the integration broker 102. In one embodiment, the user interface 106 employs a GUI to communicate existing defaults to the user, and to receive override data from the user.

The one or more instantiated table business objects are then processed 610 by the SAP query interface 400. One example method that is substantially similar to the illustrated table business object processing step 610 is provided in more detail with reference to FIG. 7. In general, the SAP query interface 400 executes a native SAP query directly on an SAP database.

The response builder module 410 returns 612 the results of the native SAP query. In one embodiment, when the query is of an "exists" query type, the response builder module 410 returns 612 the original table business object if the "exists" query was a success, and returns 612 notice of a query failure if the "exists" query was a failure. The notice of a query failure may be a business object consisting of failure information, a warning log entry, a function return value, an exception thrown by the response builder module 410, or another signal of failure.

In another embodiment, when a "retrieve-all" query has been performed, the response builder module 410 returns 612 the results of the "retrieve-all" query as one or more table business objects, whose properties are populated with the results of the query. If no records conforming to the native SAP query existed in the SAP database, a query failure may be reported as described above.

The results may also be returned in other types of data containers. In one embodiment, the response builder module 410 returns 612 the results of the native SAP query to the integration broker 102, the integration broker 102 returning the results of the native SAP query to the development environment 104 for use by the user 108.

Figure 7:
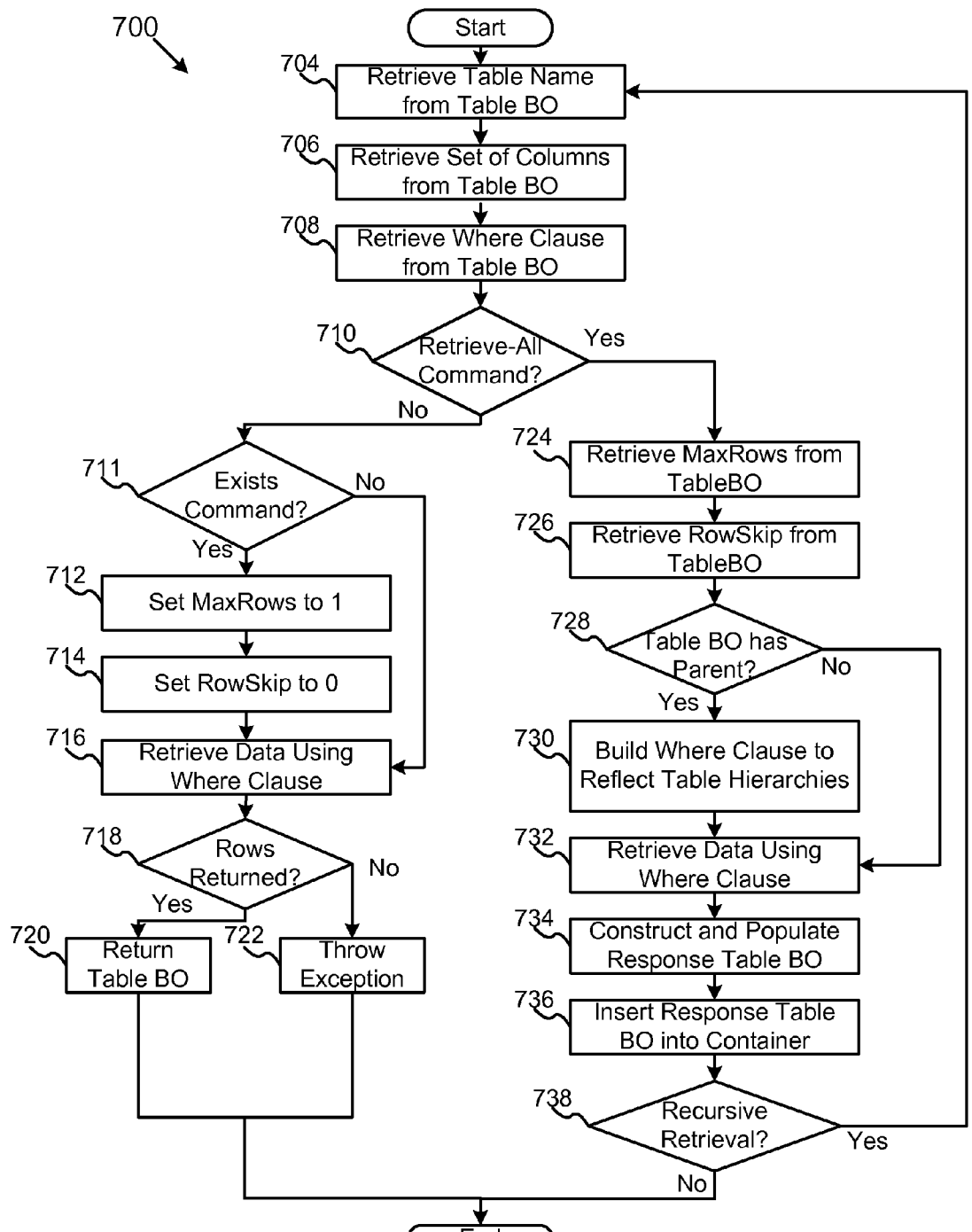
FIG. 7 is a schematic flow chart diagram illustrating one embodiment of a method for processing a table business object with an embedded query business object in accordance with the present invention.

FIG. 7 illustrates one embodiment of a method 700 for processing a table business object with an embedded query business object, which is substantially similar to the table business object processing step 610 of FIG. 6. After one or more table business objects have been instantiated 608 by the instantiation module 204, the input module 402 retrieves 704 a table name from the table business object. The input module 402 then retrieves 706 a set of columns from the table business object, and retrieves 708 a "where" clause from the table business object. In one embodiment the "where" clause is retrieved 708 from a query business object that is embedded in the table business object. In another embodiment, the "where" clause is an SAP compatible "where" clause. In a further embodiment, the "where" clause is an SQL "where" clause.

The query execution module 408 then determines 710 if the query type is "retrieve-all." If the query type is not "retrieve-all," the query execution module 408 determines 711 if the query type is "exists." If the query type is neither "retrieve-all" or "exists," then it is a standard retrieve query. In one embodiment, the query type is defined as a parameter, a property, or metadata associated with the table business object. In another embodiment, the query execution module 408 determines 710 the query type from a keyword or clause found in the query criteria itself.

If the query type is an "exists" query type, then the exists module 412 sets 712 a parameter representing the maximum number of rows to retrieve to 1, and sets 714 a parameter representing the number of rows to skip before retrieving data to 0. In one embodiment, the parameters are part of a query business object embedded in the table business object. By setting 712 a maximum rows parameter to 1, and setting 714 a row skip parameter to 0, the exists module 412 ensures that if any data records exist in the SAP database that match the query criteria defined by the "where" clause, 1 row will be returned. If the query execution module 408 determines the query type is not "exists," the method 700 retrieves 716 data without altering the parameters.

The native SAP interface module 420 retrieves 716 data from the SAP database by executing the native SAP query directly on the SAP database using the "where" clause. When performing an "exists" query, the "where" clause is not altered by the query builder module 406, but used in its original form. In one embodiment, the read-only module 416 limits query execution to read-only queries. If a row is returned 718, then the "exists" query is valid, and the response builder module 410 returns 720 a response indicating that the query was true. In one embodiment, the response builder module 410 returns 720 the original table business object to indicate that the query was true. If no rows are returned 718, the "exists" query was not valid, and the response builder module 410 throws 722 an exception indicating that the "exists" query was not valid.

If the query type was not an "exists" query type, but is a "retrieve-all" query type, in a further embodiment, the retrieve-all module 414 retrieves 724 a parameter from the table business object, the parameter representing the maximum number of rows to retrieve from the SAP database. The retrieve-all module 414 also retrieves 726 a parameter from the table business object, the parameter representing the number of rows to skip in the SAP database before retrieving data. The retrieve-all module 414 checks 728 whether or not the table business object has a parent. If the table business object has a parent, the query builder module 406 builds 730 a new "where" clause to reflect the table hierarchy, as described above. In one embodiment, the query builder module 406 builds 730 a new "where" clause by performing an AND operation between the original "where" clause and a query criteria requiring that each property in the table business object that is a foreign key is equal to the foreign key value from the table business object's parent table business object. This ensures that the query reflects the table hierarchy.

The native SAP interface module 420 retrieves 732 data from the SAP database by executing the native SAP query directly on the SAP database using the "where" clause and the parameters retrieved 724, 726 from the table business object. In one embodiment, the read-only module 416 limits query execution to read-only queries. In another embodiment, the data collector module 418 assists the native SAP interface module 420 in executing the native SAP query as an equivalent plurality of direct queries on the SAP database, as described above.

The response builder module 410 then constructs and populates 734 a response table business object comprising the results of the native SAP query. The response table business object is then inserted 736 by the response builder module 410 into a response container. If the original table business object was part of a larger query container, and there are more table business objects in the query container, then a recursive retrieval is necessary 738, and the method 700 is returns to step 704 for the next table business object in the query container.

Figure 8:
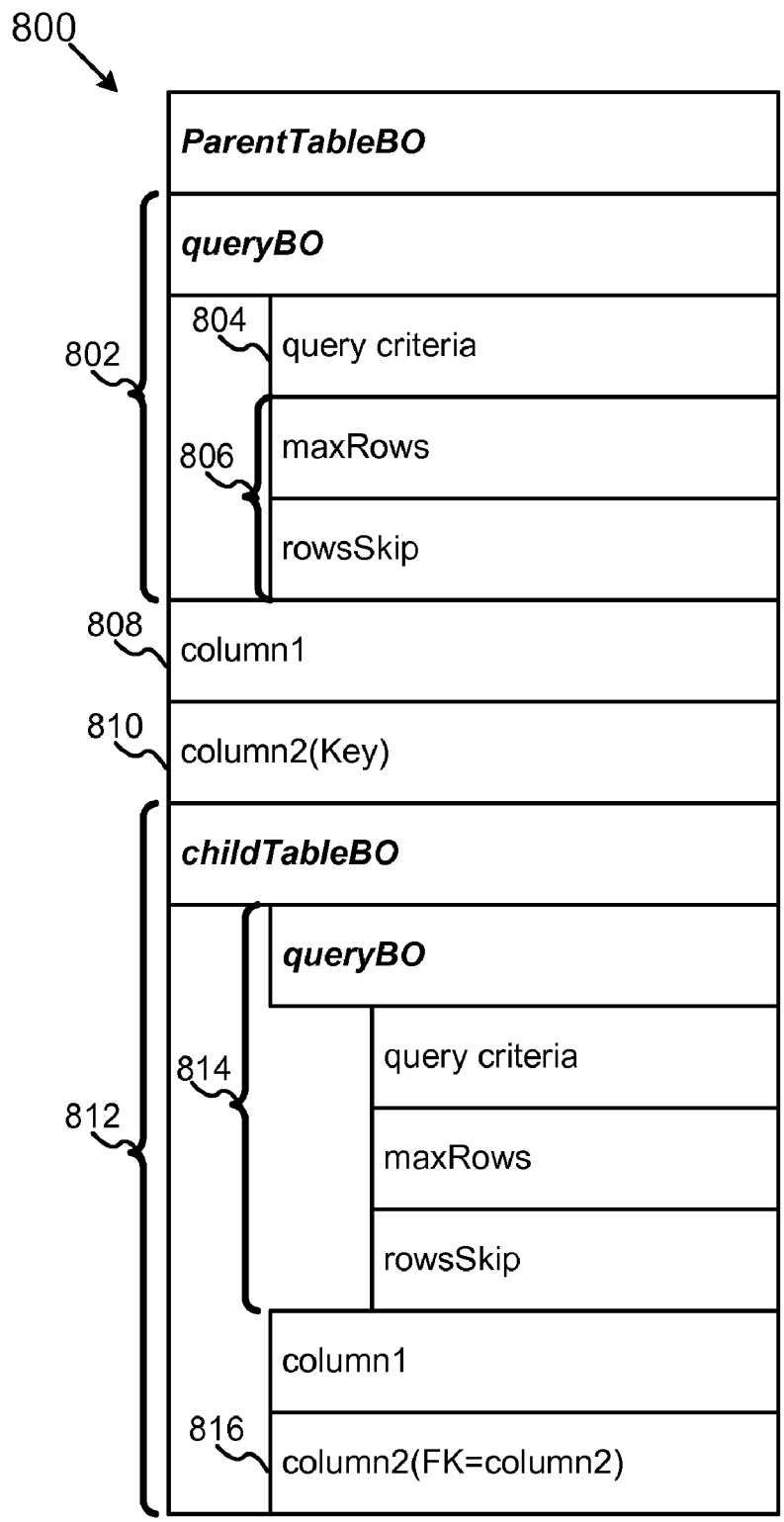
FIG. 8 is a block diagram illustrating one embodiment of a table business object in accordance with the present invention.

FIG. 8 illustrates one example of a table business object. As described above, the table business object 800 may be stored in XML, as an XSD, or in other formats. The table business object 800 represents an SAP database table, and includes of the information necessary to access or query the SAP database table. The table business object 800 comprises an embedded query business object 802, and an embedded child table business object 812.

In one embodiment, the query business object 802 is embedded in the table business object 800. The query business object 802 comprises a query criteria 804, and default query parameters 806, as described above. Because the query business object 802 is embedded in the table business object 800, when an SAP query interface receives the table business object 800, the information necessary for the SAP query interface to build a native SAP query is included in the table business object 800. The table business object 800 also includes a first column 808, and a second column 810, which each store the name of a column in the SAP database table that the table business object 800 represents.

In one embodiment, the child table business object 812 is also embedded in the table business object 800. The child table business object 812 is similar in structure to the table business object 800, and also contains an embedded query business object 814. The table business object 812 is a child table business object of table business object 800, because column2 816 is defined as a foreign key value linked to column2 810 of table business object 800. This means that the data in column2 810, and column2 816 have the same data type, and matching values, and that when querying data in both tables, a join will be performed on those columns.

Advantageously, certain embodiments of the apparatus, system, and method presented above may be implemented to retrieve hierarchical data from SAP using dynamic queries. Beneficially, such an apparatus, system, and method would also offer quick, dynamic access to an SAP database using more query types than are available using BAPI'S, while retaining all relevant SAP data, including table hierarchies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to retrieve data directly from SAP database, the apparatus comprising:
a processor;
a memory coupled to the processor to execute instructions stored in the memory, the memory comprising
an input module receiving a table business object comprising a query criteria, the query criteria selected from the a group consisting of a retrieve-all method for direct retrieval of the table business object and a data exists method to indicate a data exists status of data in the SAP database, the query criteria unsupported by a SAP business application programming interface (BAPI) of the SAP database;
a table hierarchy module determining a table hierarchy associated with the table business object using hierarchal information stored in the table business object;
a query builder module building a native SAP query based on the table hierarchy and the query criteria methods, the native SAP query built such that the native SAP query is compatible with an advanced business application programming (ABAP) application programming interface (API) of the SAP database;
a query execution module executing the native SAP query directly on the SAP database using the ABAP API; and
a response builder module returning results of the native SAP query.

2. The apparatus of claim 1, further comprising a default override module dynamically overriding the query criteria with a user supplied query criteria.

3. The apparatus of claim 1, further comprising an exists module discovering that data satisfying the query criteria exists in the SAP database.

4. The apparatus of claim 1, further comprising a retrieve-all module retrieving each data record of the query criteria from the SAP database.

5. The apparatus of claim 1, further comprising a read-only module limiting query execution to read-only queries.

6. The apparatus of claim 1, further comprising a data collector module automatically executing the native SAP query as an equivalent plurality of direct queries on the SAP database, each direct query configured to satisfy SAP size constraints.

7. The apparatus of claim 1, wherein the query builder module builds a native SAP query that is not available in a public SAP database interface.

8. The apparatus of claim 1, further comprising a table discovery module discovering accessible SAP database tables and table hierarchies.

9. The apparatus of claim 1, further comprising a table business object module building table business objects representing SAP database tables.

10. The apparatus of claim 9, wherein the table business objects contain an embedded query business object comprising a default query criteria, and one or more default query parameters.

11. The apparatus of claim 9, wherein one or more of the table business objects contain a child table business object.

12. The apparatus of claim 9, wherein the table business object module further comprises a table linker module linking table business objects according to SAP database table hierarchies.

13. The apparatus of claim 9, wherein the table business object module further comprises a selection module selecting at least one SAP database table and one or more columns for representation in a table business object.

14. The apparatus of claim 9, wherein the table business object module further comprises a default definition module defining a default query criteria for inclusion in a table business object.

15. A system to retrieve data directly from a SAP database, the system comprising:
an integration broker facilitating communication between a development environment and an SAP adapter;
a development environment in communication with the integration broker, the development environment developing a table business object comprising a table business object hierarchy based on table foreign key relationships, each table business object comprising a query business object, the development environment further comprising a user interface for communicating with a user;
an SAP adapter stored in a memory, the memory coupled to a processor to execute instructions stored in the memory, the SAP adapter in communication with the integration broker;
the SAP adapter further comprising an input module receiving a table business object comprising a query business object having a query criteria, the query criteria selected from the a group consisting of a retrieve-all method for direct retrieval of the table business object and a data exists method to indicate a data exists status of data in the SAP database, the query criteria unsupported by a SAP BAPI of the SAP database;
the SAP adapter further comprising a table hierarchy module determining a table hierarchy associated with the table business object, by way of XPATH expressions;
the SAP adapter further comprising a query builder module building a native SAP query based on the table hierarchy and the query business object, the native SAP query built such that the native SAP query is compatible with an ABAP API of the SAP database;
the SAP adapter further comprising a query execution module executing the native SAP query directly on the SAP database using the ABAP API; and
the SAP adapter further comprising a response builder module returning results of the native SAP query.

16. The system of claim 15, wherein the development environment further comprises a default override module dynamically overriding data contained in the query business object with user supplied data.

17. The system of claim 15, wherein the SAP adapter further comprises an exists module discovering that data satisfying the native SAP query exists in the SAP database.

18. The system of claim 15, wherein the SAP adapter further comprises a retrieve-all module retrieving each data record of the native SAP query from the SAP database.

19. The system of claim 15, wherein the SAP adapter further comprises a read-only module limiting query execution to read-only queries.

20. The system of claim 15, wherein the SAP adapter further comprises a data collector module automatically executing the native SAP query as an equivalent plurality of direct queries on the SAP database, each direct query configured to satisfy SAP size constraints.

21. The system of claim 15, wherein the query builder module builds a native SAP query that is not available in a public SAP database interface.

22. A computer program product comprising a computer readable non-volatile storage medium having computer usable program code programmed for the direct retrieval of data from a SAP database, the operations of the computer program product comprising:

receiving a table business object comprising a query criteria, the query criteria selected from the a group consisting of a retrieve-all method for direct retrieval of the table business object and a data exists method to indicate a data exists status of data in the SAP database, the query criteria unsupported by a SAP BAPI of the SAP database;

determining a table hierarchy associated with the table business object, by way of XPATH expressions;

building a native SAP query based on the table hierarchy and the query criteria methods, the native SAP query built such that the native SAP query is compatible with an ABAP API of the SAP database;

executing the native SAP query directly on the SAP database using the ABAP API; and returning results of the native SAP query.

23. The computer program product of claim 22, further comprising overriding the query criteria dynamically with a user supplied query criteria.

24. The computer program product of claim 22, further comprising discovering that data satisfying the query criteria exists in the SAP database.

25. The computer program product of claim 22, further comprising retrieving each data record of the query criteria from the SAP database.

26. The computer program product of claim 22, further comprising limiting query execution to read-only queries.

27. The computer program product of claim 22, further comprising automatically executing the native SAP query as an equivalent plurality of direct queries on the SAP database, each direct query satisfying SAP size constraints.

28. The computer program product of claim 22, further comprising building a native SAP query that is not available in a public SAP database interface.

29. The computer program product of claim 22, further comprising discovering accessible SAP database tables and table hierarchies.

30. The computer program product of claim 22, further comprising building table business objects representing SAP database tables.

31. The computer program product of claim 30, wherein the table business objects contain an embedded query business object comprising a default query criteria, and one or more default query parameters.

32. The computer program product of claim 30, wherein one or more of the table business objects contain a child table business object.

33. The computer program product of claim 30, further comprising linking table business objects according to SAP database table hierarchies.

34. The computer program product of claim 30, further comprising selecting at least one SAP database table and one or more columns.

35. The computer program product of claim 30, further comprising defining a default query criteria for inclusion in a table business object.

36. A method for providing dynamic query access to a SAP system for a customer, the method comprising:

installing an SAP adapter comprising an SAP query interface; and executing the SAP query interface, the SAP query interface:

receiving a table business object comprising a query criteria, the query criteria selected from the group consisting of a retrieve-all method for direct retrieval of the table business object and a data exists method to indicate a data exists status of data in the SAP database, the query criteria unsupported by a SAP BAPI of the SAP database;

determining a table hierarchy associated with the table business object, by way of XPATH expressions;

building a native SAP query based on the table hierarchy and the query criteria methods, the native SAP query built such that the native SAP query is compatible with an ABAP API of the SAP database;

executing the native SAP query directly on the SAP database using the ABAP API; and returning results of the native SAP query.

37. The method of claim 36, wherein the SAP query interface overrides the query criteria dynamically with a user supplied query criteria.

38. The method of claim 36, wherein the SAP query interface discovers that data satisfying the query criteria exists in the SAP database.

39. The method of claim 36, wherein the SAP query interface limits query execution to read-only queries.

40. The method of claim 36, wherein the SAP query interface builds a native SAP query that is compatible with a proprietary SAP database interface.

* * * * *